(12) United States Patent
Teulet

(10) Patent No.: US 9,498,921 B2
(45) Date of Patent: Nov. 22, 2016

(54) METHOD FOR CREATING AN OBJECT, BY MEANS OF LASER TREATMENT, FROM AT LEAST TWO DIFFERENT POWDER MATERIALS, AND CORRESPONDING FACILITY

(75) Inventor: Patrick Teulet, Riom (FR)

(73) Assignee: PHENIX SYSTEMS, Riom (FR)

( * ) Notice: Subject to any disclaimer, the term of this patent is extended or adjusted under 35 U.S.C. 154(b) by 734 days.

(21) Appl. No.: 13/496,575

(22) PCT Filed: Sep. 14, 2010

(86) PCT No.: PCT/FR2010/051906
§ 371 (c)(1),
(2), (4) Date: May 29, 2012

(87) PCT Pub. No.: WO2011/033215
PCT Pub. Date: Mar. 24, 2011

(65) Prior Publication Data
US 2012/0228807 A1    Sep. 13, 2012

(30) Foreign Application Priority Data

Sep. 17, 2009  (FR) ..................................... 09 56387

(51) Int. Cl.
*B29C 67/24* (2006.01)
*B29C 35/08* (2006.01)
*B29C 67/00* (2006.01)
*B22F 3/105* (2006.01)

(52) U.S. Cl.
CPC ......... *B29C 67/0077* (2013.01); *B22F 3/1055* (2013.01); *B22F 2003/1056* (2013.01); *Y02P 10/295* (2015.11)

(58) Field of Classification Search
CPC .......................... B29C 67/0077; B22F 3/1055
USPC ....... 264/225, 308, 113, 112, 425, 494, 447, 264/401; 425/174.4, 375
See application file for complete search history.

(56) References Cited

U.S. PATENT DOCUMENTS

| | | | | |
|---|---|---|---|---|
| 3,081,698 A | * | 3/1963 | Childress | B41F 15/0836 101/114 |
| 4,752,352 A | | 6/1988 | Feygin | |
| 5,088,047 A | * | 2/1992 | Bynum | B22F 3/1055 156/272.8 |
| 5,126,529 A | * | 6/1992 | Weiss | B22F 3/115 118/313 |
| 5,286,573 A | * | 2/1994 | Prinz | B22F 3/115 264/255 |
| 5,387,380 A | | 2/1995 | Cima et al. | |
| 5,474,719 A | | 12/1995 | Fan et al. | |

(Continued)

FOREIGN PATENT DOCUMENTS

| | | |
|---|---|---|
| DE | 19935274 C1 | 1/2001 |
| DE | 102007033715 A1 | 1/2009 |

(Continued)

*Primary Examiner* — Nahida Sultana
(74) *Attorney, Agent, or Firm* — Dowell & Dowell, PC

(57) ABSTRACT

According to said method, a first passage (28) having a predefined geometry is provided in a mask (4), the mask is placed in such a way that said first passage is located facing a mounting (26), a film made of a first material (A) is deposited on the mounting through the passage, and said first thus-deposited material is treated by a laser beam so as to form a first area that is made up of the first material and belongs to a first layer of said object. Then the above operations are repeated with a second material so as to form an adjacent area made up of said second material that belongs to the same layer.

12 Claims, 7 Drawing Sheets

(56) References Cited

U.S. PATENT DOCUMENTS

| | | | |
|---|---|---|---|
| 5,624,510 A * | 4/1997 | Uchida | B28B 1/00 156/62.2 |
| 5,736,084 A * | 4/1998 | Uchida | B28B 23/0075 264/112 |
| 5,753,171 A * | 5/1998 | Serbin | B29C 67/0066 250/492.1 |
| 5,876,550 A * | 3/1999 | Feygin et al. | 156/264 |
| 5,940,674 A * | 8/1999 | Sachs | B22F 3/115 264/414 |
| 6,103,160 A * | 8/2000 | Uchida | B28B 1/008 264/112 |
| 6,764,636 B1 | 7/2004 | Allanic et al. | |
| 6,767,499 B1 | 7/2004 | Hory et al. | |
| 6,861,613 B1 | 3/2005 | Meiners et al. | |
| 8,070,474 B2 * | 12/2011 | Abe et al. | 425/375 |
| 2002/0023583 A1 | 2/2002 | Kumokita et al. | |
| 2002/0093115 A1 * | 7/2002 | Jang et al. | 264/113 |
| 2002/0145213 A1 * | 10/2002 | Liu et al. | 264/40.1 |
| 2005/0263934 A1 | 12/2005 | Chung et al. | |
| 2006/0027809 A1 * | 2/2006 | Ogawa | H01L 21/268 257/66 |
| 2006/0231975 A1 | 10/2006 | Teulet | |
| 2010/0291465 A1 * | 11/2010 | Rock | H01M 8/0221 429/483 |
| 2011/0190904 A1 * | 8/2011 | Lechmann | A61B 17/7208 623/23.61 |
| 2011/0293771 A1 * | 12/2011 | Oberhofer | B22F 3/1055 425/182 |
| 2012/0199994 A1 * | 8/2012 | Richert | B29C 39/148 264/1.35 |
| 2015/0034604 A1 * | 2/2015 | Subramanian | B23K 26/0045 219/73.21 |
| 2015/0148467 A1 * | 5/2015 | Greger | C08L 53/02 524/151 |

FOREIGN PATENT DOCUMENTS

| | | |
|---|---|---|
| EP | 0776713 | 6/1997 |
| JP | 2000336403 | 5/2000 |
| JP | 2002503632 | 2/2002 |
| JP | 2005074831 | 3/2005 |
| JP | 2005335392 | 12/2005 |
| JP | 2006205456 | 8/2006 |
| JP | 2010208069 | 9/2010 |
| JP | 2012246541 | 12/2012 |
| WO | 87/07538 A1 | 12/1987 |

* cited by examiner

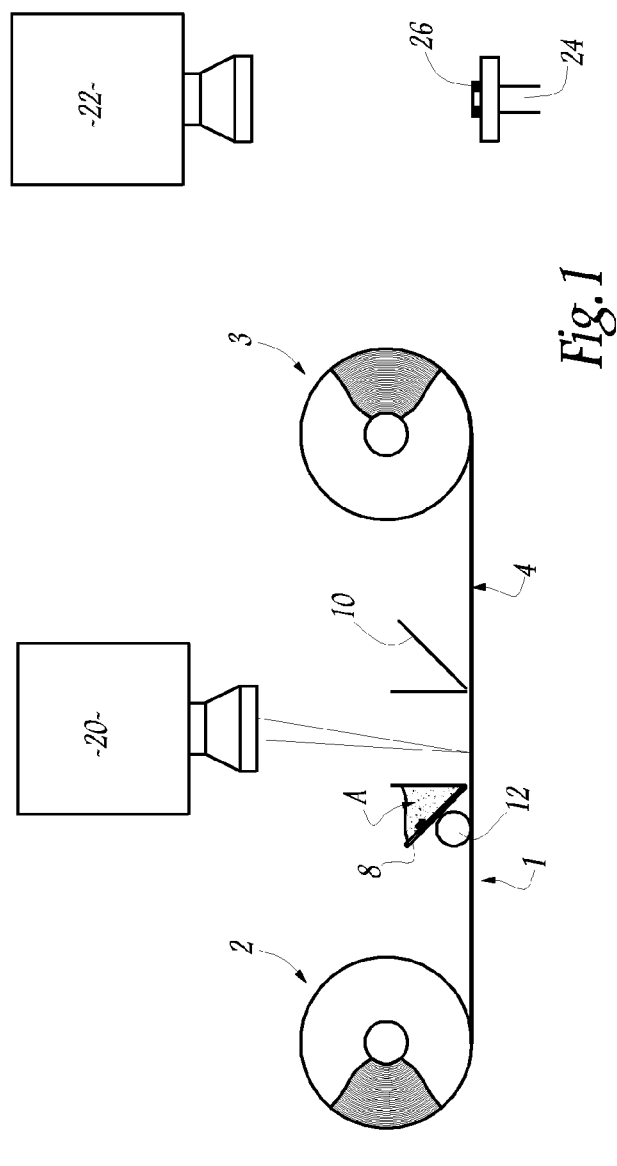
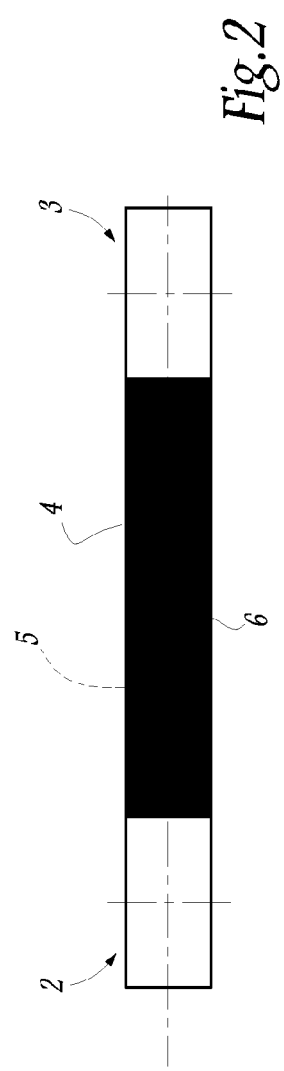

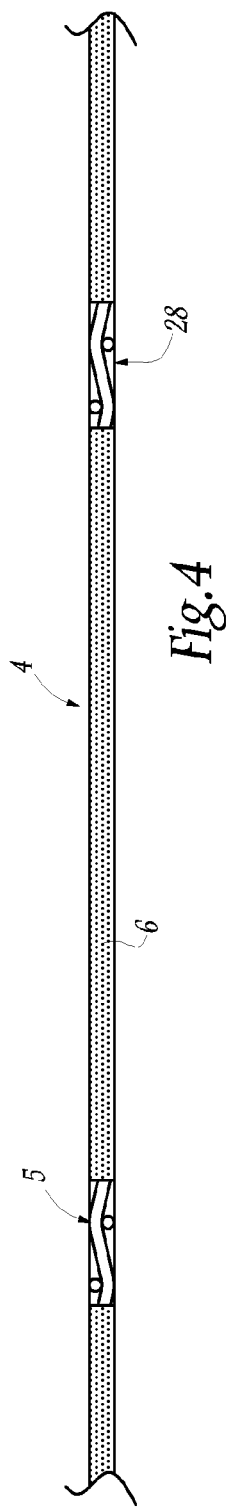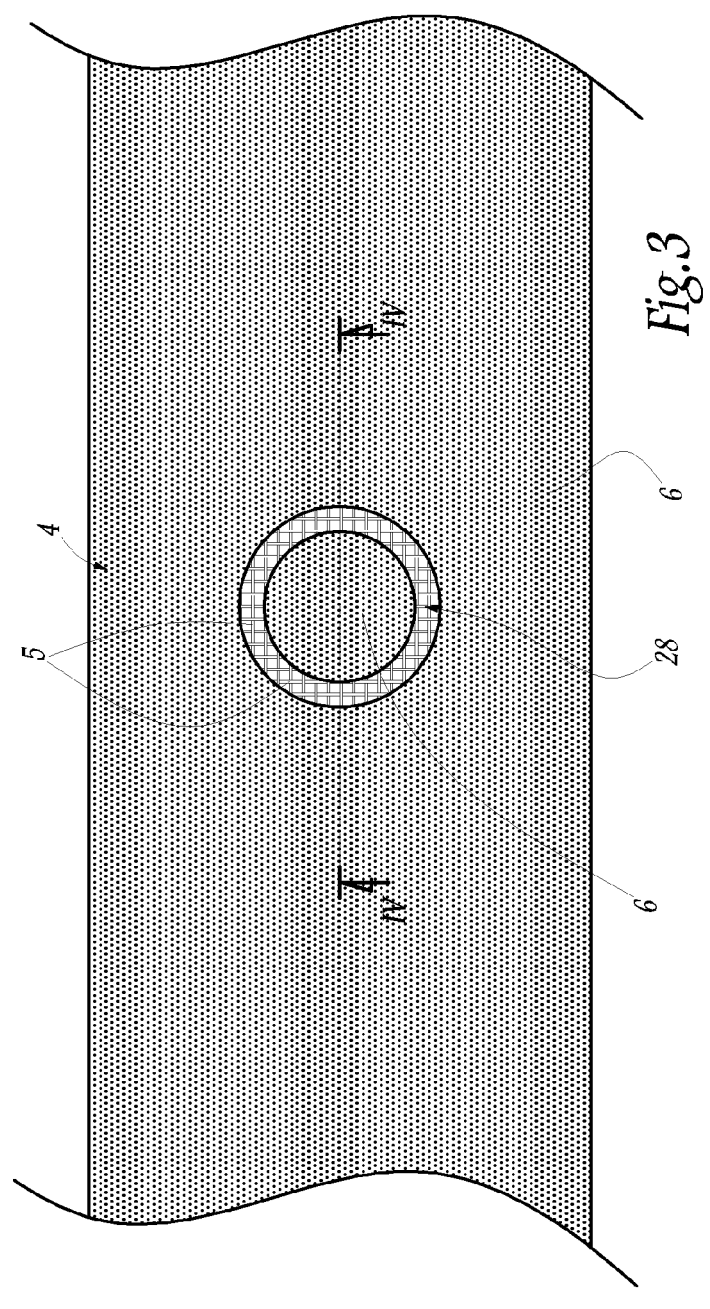

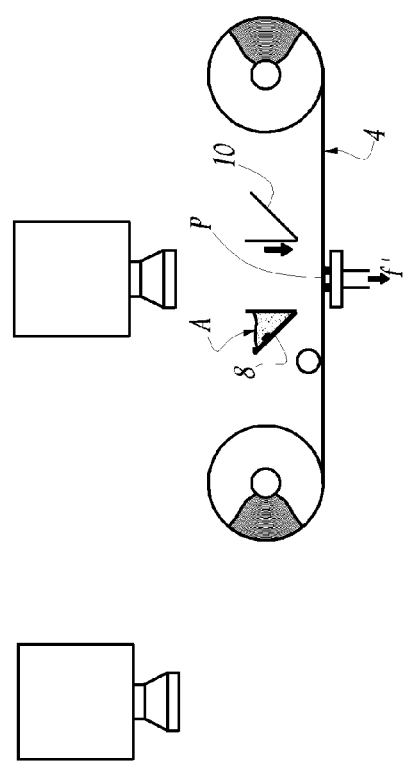
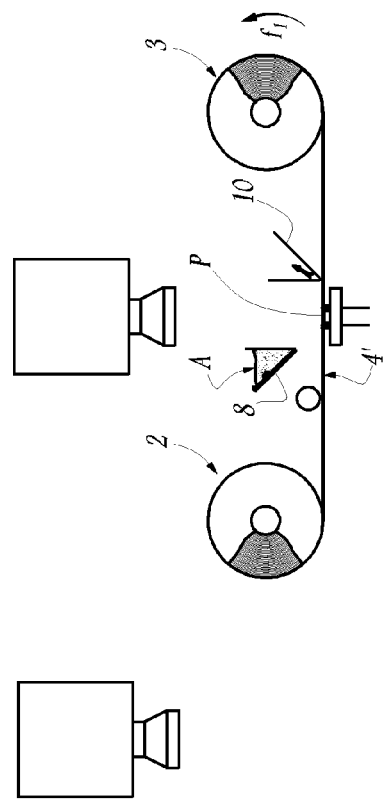

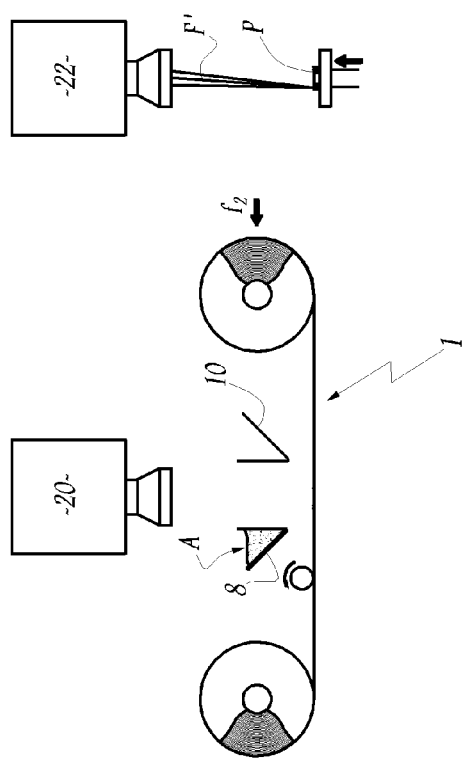

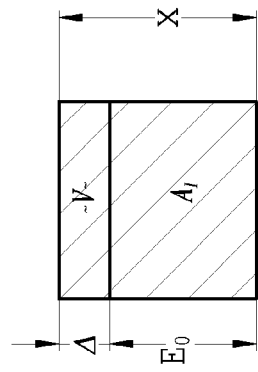
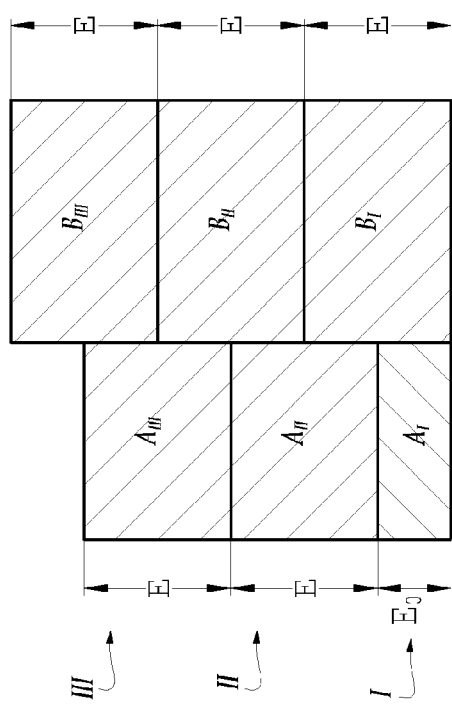
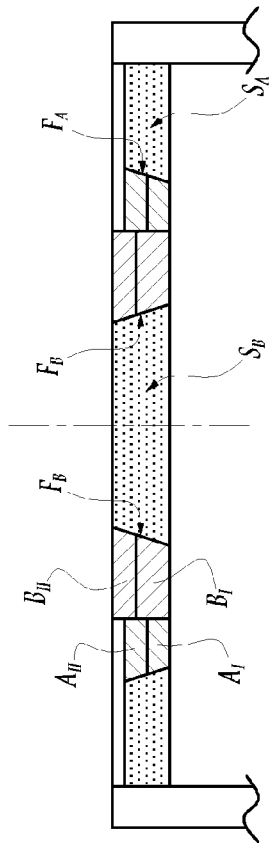

METHOD FOR CREATING AN OBJECT, BY MEANS OF LASER TREATMENT, FROM AT LEAST TWO DIFFERENT POWDER MATERIALS, AND CORRESPONDING FACILITY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION BY REFERENCE OF MATERIALS SUBMITTED ON A COMPACT DISC OR AS A TEXT FILE VIA EFS-WEB

Not Applicable

STATEMENT REGARDING PRIOR DISCLOSURES BY THE INVENTOR OR A JOINT INVENTOR

Not Applicable

BACKGROUND OF THE INVENTION (1) Field of the Invention

The present invention relates to a method for creating an object, by means of a laser treatment, from at least two different powder materials, and a facility for the implementation of said method. The term laser treatment refers to sintering or fusion.

(2) Brief Description of the Related Art

In the prior art, methods using the principle of generating successive powder beds, using a scraper or a roller, are known. To this end, reference should particularly be made to the teaching of FR-A-2 856 614. This known solution consists of extracting, from a storage area, a quantity of powder material, and moving it to an area for spreading a thin layer of said material.

A laser treatment, such as sintering or fusion, is then performed on this powder material so as to form a first layer. It is then possible to form an additional layer, extending above the first layer, the production whereof is described above. By iterating this process, a three-dimensional object formed of various layers is produced, each layer being a cross-section of said object.

However, this known solution has some drawbacks. In this way, the trajectories and positions of the particles or grains of powder material, in the plane of the first layer formed, cannot be controlled. In other words, only the thickness of said layer is controlled, but not the distribution thereof in the two other spatial directions.

In this way, it proves to be impossible to produce at least one thin layer of a powder material, having a predefined geometry, for example of the complex type, in the plane of said layer. Obviously, the presence in a single layer of a plurality of powder materials cannot be envisaged either in a satisfactory manner since there would be a partial or total mixture of a plurality of materials in the same layer.

Moreover, an alternative solution is known, whereby a powder is projected locally onto a mounting, particularly by means of a spray gun. It is conceivable that, under these conditions, it can be envisaged to deposit a plurality of different material in a single layer, i.e. for a single height area. However, the various areas of the layer, occupied by said separate materials, do not display sufficient geometric precision.

BRIEF SUMMARY OF THE INVENTION

That being said, the aim of the invention is to enable greater integration of functions in a single three-dimensional object, during the production thereof. In other words, the aim of the invention is that of producing, by means of a laser treatment method, such an object incorporating at least two different powder materials, in at least one single layer.

For this purpose, it relates to a method for creating an object from at least two different powder materials, comprising the following steps:
- a first passage having a predefined geometry is provided in a mask,
- the mask is placed in such a way that said first passage is located facing a mounting,
- a film made of a first material is deposited on the mounting, via the passage,
- said first material deposited in this way is treated, with a laser beam, so as to form a first area, consisting of the first material, and belonging to a first layer of said object,
- a second passage having a predefined geometry is provided in the mask,
- the mask is placed in such a way that said second passage is located facing the mounting,
- a film of a second material is deposited against the mounting, through the second passage,
- said second material is treated with a laser beam, so as to form a second area, consisting of the second material, and belonging to said same first layer.

According to further features:
- a mask consisting of a metal mesh and a blinding material are used,
- the mask is treated by means of a laser beam so as to locally remove a part of the blinding material, with a view to forming the passage,
- a mask formed by a sheet wound around two spools is used,
- the powder material is deposited on the surface of the mask, in the vicinity of the passage, and said powder material is pushed through said passage, particularly by means of a roller and/or a scraper,
- at least the first area is calibrated, so as to adjust the thickness of said area,
- a third area, consisting of a third material, and belonging to a first layer, is formed,
- at least a second layer is formed, extending against the first layer, including at least two different areas consisting of separate powder materials,
- the step for calibrating at least the first area of the first layer is actuated, so that all the areas of all the layers have the same thickness, including the thickest area of the first layer, but excluding the other area(s) of said first layer.

The invention also relates to a facility for the implementation of such a method as defined above, comprising:

a mask,
means for forming at least one passage having a defined geometry, in said mask,
means for feeding with at least one first and one second powder materials,
means suitable for depositing films of said first and said second materials on a mounting, through the passage,
a laser station, suitable for generating a laser beam in the direction of each film.

BRIEF DESCRIPTION OF THE SEVERAL VIEWS OF THE DRAWINGS

The invention will now be described hereinafter, with reference to the appended figures, given merely as a non-limitative example, wherein:

FIG. 1 is a side view, illustrating a facility for the implementation of a method according to the invention;

FIG. 2 is a top view, illustrating a sheet within the scope of said method;

FIGS. 3 and 4 are top and longitudinal cross-sectional views, respectively, along the line IV-IV, illustrating said sheet after implementing a first step of this method;

FIGS. 5 to 10 are front views, equivalent to FIG. 1, illustrating the implementation of various steps involved in said method;

FIGS. 14 and 15 are front views equivalent to FIGS. 11 to 13, illustrating the implementation of an advantageous alternative embodiment;

FIG. 16 is a front view, illustrating the implementation of a further alternative embodiment of the invention.

DETAILED DESCRIPTION OF THE INVENTION

Figure 5:
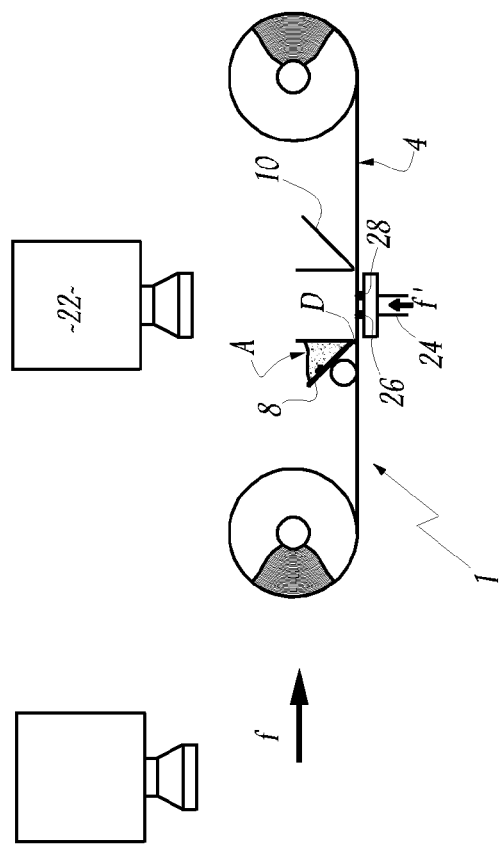

FIG. 1 illustrates a facility for implementing the production method, according to the invention. This facility firstly comprises a mobile unit 1, suitable for being moved along a generally horizontal direction, by any suitable means not shown. This unit comprises two spools 2 and 3, formed by winding a sheet defining, in the area situated between the spools, a mask 4.

This sheet firstly comprises a mesh 5, and a material 6 for blinding the openings defined by said mesh. This mesh 5, acting as a grid, is both resistant and flexible. This mesh consists of wires, particularly of the woven metal type, thus acting as meshes through which the powder material to be deposited can flow, as seen hereinafter. As a non-limitative example, the cross-section of the wires forming the mesh may be approximately 40 microns. Furthermore, the distance separating two adjacent wires may be approximately 106 microns.

Also as a non-limitative example, it can be considered that a minimum value, both of the wire cross-section and the distance between two adjacent wires, is approximately 20 microns. With respect to the maximum value, it is possible to envisage, in a non-limitative manner, wires having a cross-section of 0.6 mm, two adjacent wires being separated by a distance of 1.5 mm. The above numeric indications, relating equally to typical, minimum and maximum values, should obviously not be interpreted as being mandatory according to the invention.

The blinding material 6, which entirely occupies the various orifices formed by the mesh, is of any suitable type. In view of the requirements of the method, it should have a lower resistance than that of the constituent material of the mesh, particularly in terms of thermal resistance.

The mobile unit 1 further comprises a station 8 for feeding a first powder material, referenced A, a station 10 for the suction of said material, and a roller 12. Said roller, which is suitable for rotating about the axis thereof, so as to move along the mask, is intended to spread the powder material as seen hereinafter.

The facility according to the invention further comprises a first laser station 20, suitable for targeting a laser beam towards the mask 4. This first station 20 is of any known type, suitable for this function which will be described in detail hereinafter.

Moreover, a second laser station 22 is envisaged, intended for treating powder material as seen hereinafter. This station 22 is suitable for engaging with plunger 24, movable in the vertical direction. A mounting 26, resting on the plunger 24 is intended to receive various powder materials.

In a first phase of the method according to the invention, a part of the blinding material is removed locally, in the sheet acting as the two spools. This removal operation is performed using the laser beam F generated by the station 20.

In the example illustrated, this operation is used to form an opening 28, having an annular shape, which reveals the constituent wires of the mesh 5 (FIGS. 3 and 4, the latter being on a larger scale). Consequently, it is envisaged that the powder material is suitable for passing through this opening 28 while being retained by the adjacent blinding material.

Subsequently, after the formation of this opening 28, the movable unit is moved towards the second laser station 22 (arrow f in FIG. 5). In order to avoid any contact between the mounting 26 and the mask 4, during the movement thereof, the plunger 24 is lowered along a suitable stroke.

Following this movement, the annular opening 28 is positioned, such that the centre thereof is aligned with the plunger axis, which is vertical in the figures. The plunger is then raised (arrow f'), so as to place the top face of the mounting 26 in contact with the bottom face of the mask 4. A dose D of the first powder material A is then deposited, via the feed 8, said dose being poured onto the top face of the mask 4, at a distance of the opening 28.

Figure 6:
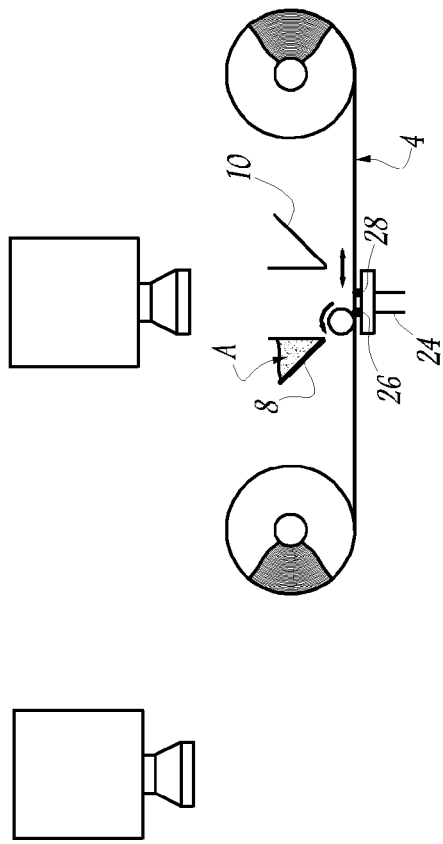

Subsequently, the feed and suction stations are raised, and the roller 12 is actuated (FIG. 6), so that it moves along the area of the mask, situated around the opening 28. Consequently, this roller also moves at right angles with this opening 28. In a purely non-limitative example, the movement of this roller is for example according to the teaching of French patent 2 856 614 held by the applicant.

Following this step, the roller has pushed the material through the opening 28, via the screen mesh 5, in the direction of the top face of the mounting 26. This movement of the roller 12 is advantageously a to-and-fro movement along the horizontal direction. In other words, this roller describes an outward stroke, followed by a return, i.e. it performs two passages above the opening 28 before returning to the original position thereof. In an alternative embodiment, the roller can describe a plurality of return movements, before returning to said initial position. In a further alternative embodiment not shown, with a view to introducing the powder material through the opening 28, it is also possible to use a scraper, to replace the roller 12, or combined with same.

After said passage of the roller, the mounting 26 is consequently coated with a film P of the first powder material, which is arranged according to the desired geometric shape, in this instance along a ring. Subsequently, the plunger is lowered by a suitable stroke (arrow f" in FIG. 7), in order to place said film at a distance from the bottom face of the mask.

The roller 12 is raised, and the spool 3, positioned on the right in the figures (arrow f1 in FIG. 8), is wound. Consequently, this induces a movement of the entire sheet to the right. This movement makes it possible to place a new mask 4', i.e. a fully blinded new portion of blank sheet, between the two spools 2 and 3. Furthermore, this movement of the sheet makes it possible to target the powder overflow in the direction of the suction station 10, with a view to the recovery thereof. Subsequently, the suction station is raised and the mobile unit 1 is moved to the original position thereof, i.e. at right angles with the first laser station 20 (arrow f2 in FIG. 9).

The mounting provided with the film P of powder material is then situated opposite the laser treatment station 22, without inserting the mask 4. It is then possible to generate a beam F', so as to perform a laser treatment, by means of fusion or sintering, in a manner known per se (FIG. 9). This action is advantageously completed by the passage of a calibration roller 30, of a type known per se (FIG. 10), which is used to calibrate, in a precise manner, the thickness of the area of the first material treated with a laser.

Figure 11:
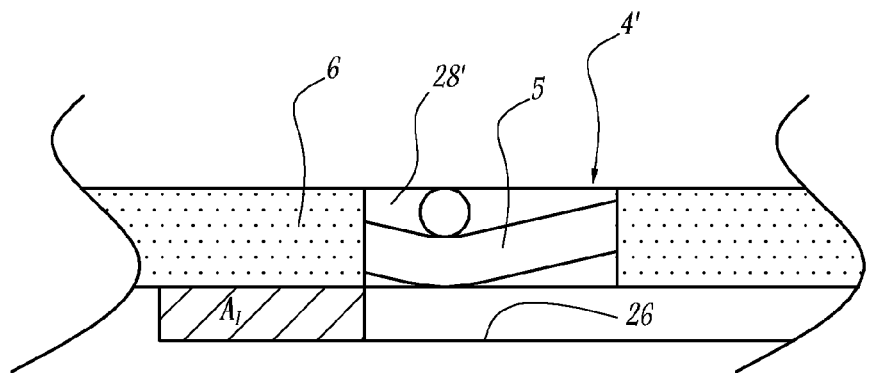
FIGS. 11 to 13 are front views, on a much larger scale, illustrating some of the steps in FIGS. 5 to 10.

Following the operations described above, the mounting 26 is coated with an area of the first material, belonging to a first layer of the object produced according to the invention. This area, which is assigned the reference $A_I$, with reference to the first material A and the first layer I, is visible on a larger scale in FIG. 11 and following.

It should be noted that, usually, the powder material used within the scope of the method according to the invention may be subject to a compaction phenomenon during the laser treatment thereof. In other words, the thickness of the final area $A_I$ is less than that of the film P of powder material, prior to said laser treatment. Typically, this compaction ration is approximately 2, i.e. the thickness of the film P is approximately double the thickness of the final area $A_I$, consisting of the laser-treated powder material.

According to the invention, it is then possible to form, in said first layer I, an area $B_I$ consisting of a powder material B, different from A. For this purpose, the operations described above are repeated, i.e.:

formation of a further cut, having a given geometry in the mask, movement of the mobile unit towards the laser station 22, at the same time as the lowering of the mounting and the area $A_I$, deposition of a suitable quantity of the second material. For this purpose, it is possible to change the entire feed station or, alternatively, use the same station wherein the material B has been poured;

passage of the roller, so as to force the passage of the second material through the second cut, removal of the mobile unit, laser treatment so as to form a second area $B_I$, consisting of the second material in the first layer, followed by calibration.

It is then possible, if applicable, to create further areas made of other materials, in the same first layer I. Any area created in a third material, in said first layer is referenced $C_I$ and, by iteration, an area created in an nth material in the same first layer is referenced $N_I$.

Once this first layer has been created, from the various areas consisting of separate materials, it is possible to form at least one additional layer, above said first layer. For this purpose, this second layer may consist of a plurality of areas, consisting of all or part of the powder materials used to form the first layer. It should also be noted that this second layer can incorporate additional materials, which have not been used for the first layer. For example, the various areas of said second layer II, consisting of the first, second, third, up to the nth, powder materials, are references $A_{II}$, $B_{II}$, $C_{II}$ and by iteration $N_{II}$.

By repeating the above operations, the implementation of the invention gives rise to the creation of a three-dimensional object, consisting of a number, referenced M, of successive layers. Furthermore, as can be seen from the above, each of these layers may consist of various powder materials, the number and the nature of these materials optionally varying from one layer to another. To illustrate the idea, if M is the final layer, i.e. the free layer opposite the layer I, the various areas of said layer M, consisting of the first, second, . . . , nth powder materials are referenced $A_M$, $B_M$, . . . , $N_M$. Consequently, the invention makes it possible to create a three-dimensional object including at least two separate materials in the same layer.

It should be noted that powder materials are characterised and differentiated by the chemical composition thereof and/or the grain size distribution thereof and/or the granularity thereof. Indeed, at least only one of these criteria is sufficient to render a powder material unique.

Consequently, the invention allows a greater integration of functions in the same three-dimensional object, during the production thereof. Such functions may particularly be thermal conductivity, electrical conduction or insulation, enhancing friction or sliding coefficients, resistance to temperature, resistance to corrosion, surface hardness, increasing refractory features, enhancing the surface condition or in terms of production conditions, precision, productivity, reducing internal residual stress, etc. Furthermore, it should be noted that the invention makes it possible to give the various areas of the same layer, made of separate powder materials, a perfectly defined geometry.

For the formation of the area $B_I$, the bottom face of the mask 4' bears against the top face of the area $A_I$ (see FIG. 11), and not directly on the mounting 26. Under these conditions, the film P' (see FIG. 12) of said second material, coating the mounting after passing through the opening 28', has a thickness greater than that of the film P of the first material, the deposition of which is described above. In this way, after compaction of the material B during the laser treatment, the thickness of said area $B_I$, is greater than that of the area $A_I$, creating a shift being the free ends thereof (FIG. 13).

It can also be conceived that, if a second layer of these two materials is to be deposited, this shift will also occur on the areas of said second layer. The same applies if more than two materials are to be deposited in the same layer.

However, according to an advantageous feature of the invention, all the areas have the same thickness, including the final area of the first layer, but excluding the first area(s) of said first layer. In other words, if two materials are used (FIG. 14), all the areas $A_{II}$, $A_{III}$, $B_I$, $B_{II}$ and $B_{III}$ have the same thickness E, including the second area $B_I$ of the first layer I, i.e. the thickest, but, on the other hand, not the first area $A_I$ of the first layer, i.e. that deposited first. In FIG. 14, the second and third layers are referenced II and III. More generally, in the case of N areas per layer, all the areas have the same thickness, excluding the (N−1) first areas of the first layer, but including the thickest area of said first layer.

The thickness of each area is directly dependent on the thickness of the uppermost previously deposited area, the height of the mask and the compaction ratio. In the case of two materials, the thickness to be achieved in each area of each layer, excluding the area of the first layer deposited first, is referenced E.

The film of the first material of the first layer is deposited directly on the mounting, with a thickness substantially equivalent to that of the mask. Subsequently, after laser treatment, the treated powder material has a thickness referenced X (see FIG. 15). However, this consists of an intermediate phase of production, since said treated material is subjected to the calibration step, making it possible to reduce the height thereof, so as to form the definitive layer $A_I$ having the thickness $E_0$. It can be conceived that $$E_0 = X - \Delta,$$

where $\Delta$ consists of the thickness of the volume V of laser-treated material, removed during the calibration step.

It is advantageous to control this calibration step, so that said value $E_0$ is equivalent to a predetermined fraction of the desired thickness E, defined above. It is permitted to obtain areas having the same thickness E, by calibrating the first area, such that the thickness $E_0$ thereof is equal to half the desired thickness E.

Similarly, if a number N of areas greater than 2 is deposited, in the same layer, the calibration of the first area $A_I$ is actuated, such that the thickness $E_0$ is equal to E/N. After calibration, the area $B_I$ of the second material has a thickness double $E_0$, whereas the third material has a thickness equal to triple $E_0$. In this way, for J varying from 1 to N, the thickness of the area $J_I$ of the Jth material is equal to $(J*E_0)$.

Those skilled in the art would be able to adapt the calibration values described above, according to the variations in the method parameters, as described above. This calibration would be different, particularly, in the event of variation of the compaction ratio of these materials.

Figure 12:
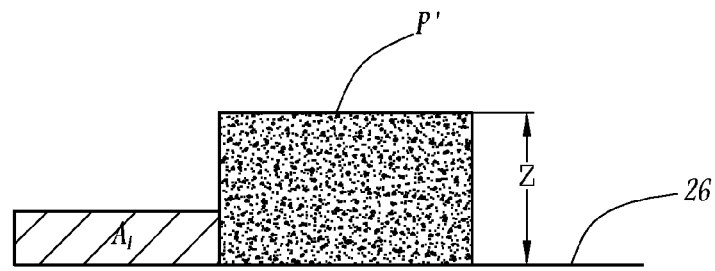
Figure 13:
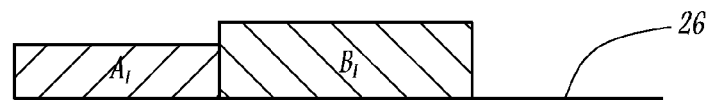

In this way, with reference to FIGS. 12 and 13, the height of the area $B_I$ is equal to half of that, referenced Z in FIG. 12, of the film P'. Indeed, the compaction ratio is 2. More generally, for a ratio T, this height is equal to $Z*(1/T)$.

FIG. 16 illustrates a further advantageous alternative embodiment of the invention. In this figure, two powder materials A and B are observed, forming on two successive layers areas referenced $A_I$, $B_I$, $A_{II}$ and $B_{II}$. It should be noted that these areas have undercut faces referenced $F_A$ and $F_B$.

Advantageously, powder material is deposited, not only at the location intended to form the abovementioned areas, but also in the vicinity thereof. This makes it possible to form mountings made of powder material, referenced $S_A$ and $S_B$, in the vicinity of the laser-treated sections.

The invention is not limited to the examples described and shown.

In this way, in the example, the mask is formed by means of a first laser beam. However, in an alternative embodiment, it is possible to envisage preforming each opening 28 or 28'. In this way, during the creation of the sheet, it is possible to coat the mesh using a sparing mask, such that the blinding material does not coat the entire mesh, so as to form openings having a desired geometry.

The invention claimed is:

1. Method for creating an object from at least first and second powder materials, comprising the following steps:
providing a first passage having a predefined geometry in a mask, the mask consisting of a metal mesh and a blinding material, and the mask being treated by a first laser beam so as to remove a part of the blinding material to form the first passage,
locating the mask such that said first passage is facing a mounting,
depositing the first powder material on the mounting, via the first passage, thus obtaining a first film of the first powder material,
treating the deposited first powder material with a second laser beam so as to form a first area, consisting of the first powder material, and belonging to a first layer of said object,
providing a second passage having a predefined geometry in the mask,
placing the mask in such a way that said second passage is located facing the mounting,
depositing the second powder material after having treated the first powder material, thus obtaining a second film of the second powder material against the mounting, through the second passage, and
treating said second powder material with said second laser beam, so as to form a second area consisting of the second powder material, and belonging to said first layer.

2. Method according to claim 1, including forming the mask out of a sheet being wound around two spools.

3. Method according to claim 1, wherein the first powder material is deposited on the surface of the mask, in the vicinity of the first passage, and said first powder material is pushed through said first passage.

4. Method according to claim 1, wherein at least the first area is calibrated by a calibration roller so as to adjust the thickness of said first area.

5. Method according to claim 1, including forming a third area consisting of a third powder material belonging to the first layer.

6. Method according to claim 1, including forming at least a second layer extending against the first layer and including at least the first area and second area consisting of the first and second powder materials.

7. Method according to claim 6, including forming at least the first area of the first layer so that all areas of all the layers have the same thickness, including the thickest area of the first layer, but excluding any other areas of said first layer.

8. Method according to claim 3, wherein the powder material is pushed through said first passage by a roller.

9. Method according to claim 3, wherein the powder material is pushed through said first passage by a scraper.

10. The method according to claim 1, wherein the metal mesh of the mask consists of wires of a woven metal type.

11. The method of claim 1, wherein the metal mesh of the mask consists of wires of a woven metal type, the wires having a cross-section between 20 and 600 microns.

12. The method according to claim 1, wherein the mask is treated by said first laser beam so as to remove a part of the blinding material to form the second passage.

* * * * *